US012054179B2

(12) United States Patent
Imran et al.

(10) Patent No.: US 12,054,179 B2
(45) Date of Patent: Aug. 6, 2024

(54) KURTOSIS BASED PRUNING FOR SENSOR-FUSION SYSTEMS

(71) Applicant: Aptiv Technologies AG, Schaffhausen (CH)

(72) Inventors: Syed Asif Imran, Moorpark, CA (US); Jan K. Schiffmann, Newbury Park, CA (US); Nianxia Cao, Oak Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/173,045

(22) Filed: Feb. 22, 2023

(65) Prior Publication Data

US 2023/0192146 A1 Jun. 22, 2023

Related U.S. Application Data

(63) Continuation of application No. 17/129,775, filed on Dec. 21, 2020, now Pat. No. 11,618,480.
(Continued)

(51) Int. Cl.
*B60W 60/00* (2020.01)
*B60W 30/095* (2012.01)
(Continued)

(52) U.S. Cl.
CPC .... *B60W 60/0027* (2020.02); *B60W 30/0956* (2013.01); *B60W 50/0205* (2013.01);
(Continued)

(58) Field of Classification Search
CPC ......... B60W 60/0027; B60W 30/0956; B60W 50/0205; B60W 2554/20;
(Continued)

(56) References Cited

U.S. PATENT DOCUMENTS 10,565,468 B2 2/2020 Schiffmann
2015/0324652 A1 11/2015 Mizutani
(Continued)

OTHER PUBLICATIONS

"Extended European Search Report", EP Application No. 21153654. 5, Jun. 17, 2021, 12 pages.
(Continued)

*Primary Examiner* — Tiffany P Young
(74) *Attorney, Agent, or Firm* — Harness, Dickey & Pierce, P.L.C

(57) ABSTRACT

Kurtosis based pruning for a sensor-fusion system includes aligning candidate radar tracks with one of multiple candidate visual tracks. For each candidate vision track, a weight or other evidence of matching is assigned to each candidate radar track. An inverse of matching errors between each candidate vision track and each candidate radar track contributes to the evidence, which is normalized to produce, for each candidate vision track, a distribution associated with all candidate radar tracks. A Kurtosis or a shape of this distribution is calculated. Based on Kurtosis values, some candidate radar tracks are selected for matching and other remaining candidate radar tracks are pruned. The Kurtosis is used to determine how many candidates to retain and how many to prune.

20 Claims, 6 Drawing Sheets

Related U.S. Application Data

(60) Provisional application No. 63/115,142, filed on Nov. 18, 2020.

(51) Int. Cl.
*B60W 50/02* (2012.01)
*G01S 13/931* (2020.01)
*G06T 7/20* (2017.01)

(52) U.S. Cl.
CPC .............. *G01S 13/931* (2013.01); *G06T 7/20* (2013.01); *B60W 2420/40* (2013.01); *B60W 2420/403* (2013.01); *B60W 2420/408* (2024.01); *B60W 2420/54* (2013.01); *B60W 2554/20* (2020.02); *B60W 2554/4029* (2020.02); *G06T 2207/10028* (2013.01); *G06T 2207/10044* (2013.01); *G06T 2207/10048* (2013.01); *G06T 2207/10132* (2013.01); *G06T 2207/30252* (2013.01)

(58) Field of Classification Search
CPC ..... B60W 2554/4029; B60W 2420/40; B60W 2420/42; B60W 2420/52; B60W 2420/54; G01S 13/931; G06T 7/20; G06T 2207/10028; G06T 2207/10044; G06T 2207/10048; G06T 2207/10132; G06T 2207/30252
USPC .......................................................... 701/28
See application file for complete search history.

(56) References Cited

U.S. PATENT DOCUMENTS

| | | |
|---|---|---|
| 2017/0206436 A1 | 7/2017 | Schiffmann |
| 2019/0049968 A1* | 2/2019 | Dean ........................ A61G 5/04 |
| 2019/0147372 A1 | 5/2019 | Luo et al. |
| 2021/0231794 A1 | 7/2021 | Song et al. |
| 2022/0129684 A1 | 4/2022 | Saranin et al. |

OTHER PUBLICATIONS

"Extended European Search Report", EP Application No. 21204760.9, Apr. 28, 2022, 10 pages.
"Kurtosis (K)", Retrieved from https://www.vosesoftware.com/riskwiki/Kurtosis(K).php on Dec. 18, 2020, 2017, 7 pages.
"Kurtosis", Retrieved from https://en.wikipedia.org/w/index.php?title=Kurtosis&oldid=930917675 on Dec. 18, 2020, 12 pages.
Bhuvana, et al., "Integrated Camera and Radar Tracking using Multi-Model Cubature Kalman Filter", Nov. 11, 2019, 5 pages.
Sengupta, et al., "A DNN-LSTM based Target Tracking Approach using mmWave Radar and Camera Sensor Fusion", Jul. 15, 2019, 6 pages.

* cited by examiner

KURTOSIS BASED PRUNING FOR SENSOR-FUSION SYSTEMS

CROSS-REFERENCE TO RELATED APPLICATIONS

This application is a continuation of U.S. patent application Ser. No. 17/129,775, filed Dec. 21, 2020, which claims the benefit under 35 U.S.C. 119(e) of U.S. Provisional Application No. 63/115,142, filed Nov. 18, 2020, the disclosures of which are incorporated in their entireties by reference herein.

BACKGROUND

In some automobiles, a sensor-fusion system or so-called "fusion tracker" may combine information (e.g., vehicle speed, yaw rate, position) obtained from multiple sensors to support autonomous or semi-autonomous controls. The combined sensor data can be used to estimate objects of interest that are present in a field-of-view (FOV) or so-called instrument FOV. Inferences of position, velocity, trajectory, size, class, and other parameters can be made for each object being tracked; accuracy of these inferences increases when different categories of sensors are used. Correlating inputs from multiple sensors for purposes of object tracking can be computationally complex, often requiring sophisticated and expensive processing hardware to handle computational explosions that may result. To improve throughput and processing speed, some fusion trackers specialize or only track certain types of objects (e.g., vehicular objects); these specialized-fusion trackers may deliberately discard candidate tracks for some classes of objects (e.g., pedestrians). However, to ensure safety and precise control, it is desirable for sensor-fusion systems to simultaneously-track multiple classes of objects (e.g., vehicles and pedestrians) without lag and without risk of combinatorial explosion.

SUMMARY

This document describes Kurtosis based pruning for sensor-fusion systems. In one example, a method includes determining, by a sensor-fusion system, a plurality of first candidate object-tracks according to first sensor data obtained from a first set of sensors, determining, by the sensor-fusion system, a set of second object-tracks according to second sensor data obtained from a second set of sensors, and for each first candidate object-track from the plurality of first candidate object-tracks, applying, by the sensor-fusion system, a respective weight to a particular object-track from the set of second object-tracks. The method further includes determining, by the sensor-fusion system and based on the respective weight applied to the particular object-track for each first candidate object-track from the plurality of first candidate object-tracks, a distribution of the respective weights applied to particular object-track, determining, by the sensor-fusion system, a Kurtosis of the distribution of the respective weights applied to particular object-track, and the method may further include pruning, by the sensor-fusion system, from the plurality of first candidate object-tracks, at least one candidate object-track based on the Kurtosis. The method further includes matching, by the sensor-fusion system, the particular object-track with one or more remaining candidate object-tracks from the plurality of first candidate object-tracks, even after the at least one object-track is pruned.

In one example, a system includes a processor configured to perform this and other methods. In another example, a system is described including means for performing this and other methods. This document also describes computer-readable storage medium comprising instructions that, when executed, configured a processor to perform the above-summarized method and other methods set forth herein, in addition to describing systems configured to perform the above-summarized method and the other methods set forth herein.

This summary introduces simplified concepts of Kurtosis based pruning for sensor-fusion systems, which are further described below in the Detailed Description and Drawings. This summary is not intended to identify essential features of the claimed subject matter, nor is it intended for use in determining the scope of the claimed subject matter. That is, one problem solved by the described techniques is a problem of combinatorial explosion that may occur in other assignment scenarios where a quantity of agents and/or tasks increases exponentially. Therefore, although primarily described in the context of improving fusion tracker matching algorithms, Kurtosis based pruning can be applied to other applications where prevention of combinatorial explosion to reduce possible matching assignments is desired.

BRIEF DESCRIPTION OF THE DRAWINGS

The details of one or more aspects of Kurtosis based pruning for sensor-fusion systems are described in this document with reference to the following figures. The same numbers are often used throughout the drawings to reference like features and components.

FIGS. 3-1 through 3-3 illustrate details of an example Kurtosis based pruning, in accordance with techniques of this disclosure.

DETAILED DESCRIPTION

Overview

As already mentioned, fusion trackers are challenged with quickly and correctly determining high-level matchings between low-level candidate object-tracks of multiple sensors (e.g., a radar, an ultrasound, an infrared camera, an optical or "vision" camera, a lidar). Each candidate, high-level fusion-based object-track corresponds to a single object, multiple objects, or a portion of a single object that is identifiable within the fusion tracker's FOV. In a congested FOV (e.g., when many objects exist including vehicle and pedestrian traffic, when the FOV encompasses a large space including a three hundred sixty degree view), the fusion tracker may underperform due to combinatorial explosions that can occur from attempting to simultaneously match and track many low-level candidate object-tracks moving in a vast volume of space (e.g., outdoors). To improve combinatorial performance during matching, Kurtosis based pruning is described.

Kurtosis based pruning seeks to reduce the number of comparisons performed when fusing together multiple sets of sensor data (e.g., two groups of object-tracks). Consider an example where multiple radar-based candidate object-tracks possibly align with one of multiple camera-based object-tracks. For each camera-based object-track, a weight or other evidence of matching is assigned to each possible radar-based candidate object-track. This evidence is deduced from matching errors that exist between each camera-based object-track and each possible radar-based candidate object-track. The inverse of these errors represents the evidence that may be normalized to produce, for each camera-based object-track, a distribution of evidence associated with all radar-based candidate object-tracks.

A Kurtosis or shape of this distribution is calculated. Radar-based candidate object-tracks are selected for matching based on the Kurtosis, and remaining radar-based candidate object-tracks are pruned. The Kurtosis is used to determine a quantity of N object-tracks to retain, where N represents the highest weighted radar-based candidate object-tracks that are candidates for matching to a particular camera-based object-track. The rest of the object-tracks that are not retained, can be discarded, or pruned as candidates. By eliminating some cross-comparisons of candidate tracks that would otherwise occur during matching between two or more different types of sensor data, Kurtosis based pruning may prevent combinatorial explosions from happening where other sensor-fusion systems cannot.

Example Environment

Figure 1:
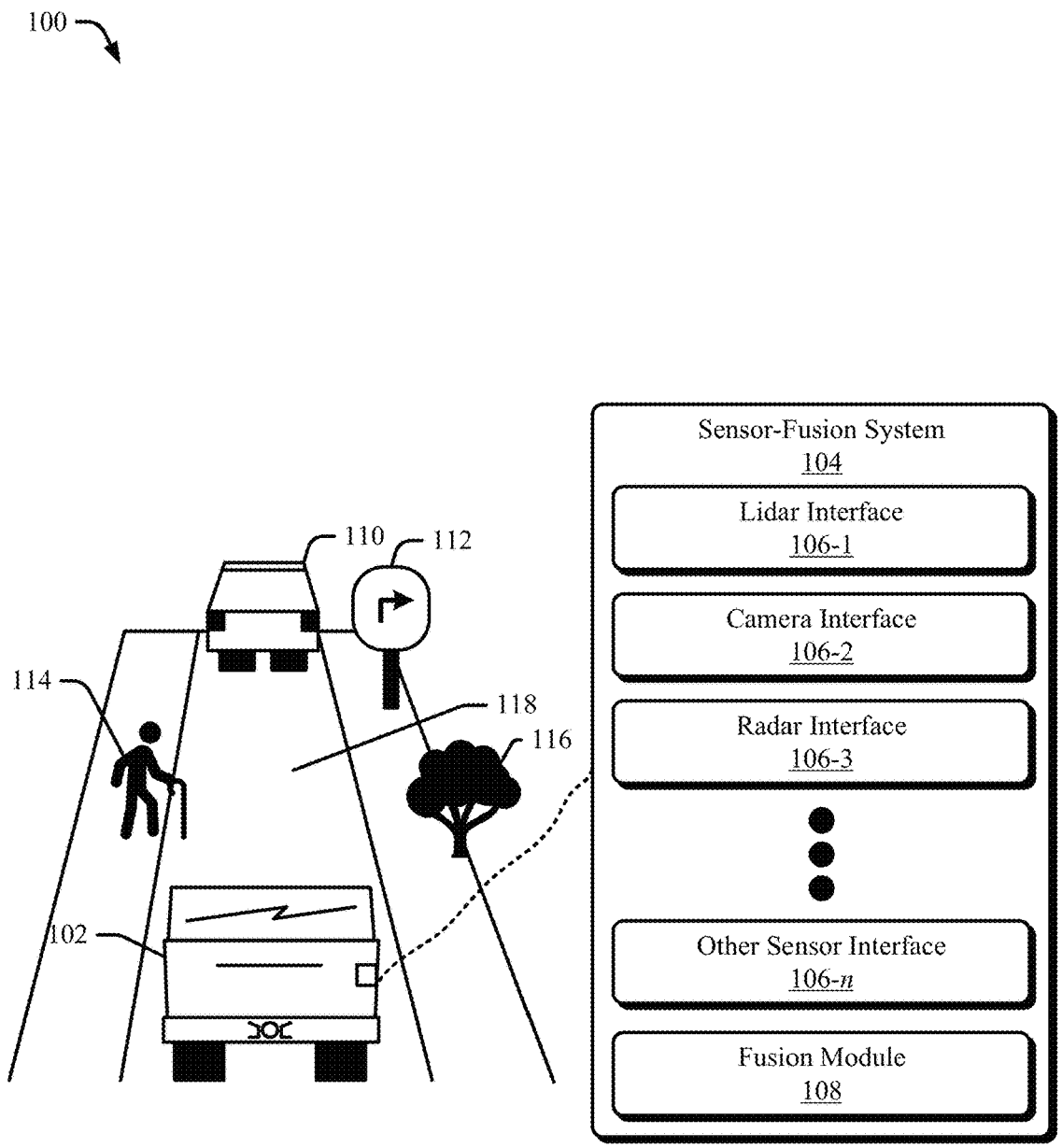
FIG. 1 illustrates an example environment in which a system is configured to perform Kurtosis based pruning for sensor-fusion systems, in accordance with techniques of this disclosure.

FIG. 1 illustrates an example environment in which a system 102 is configured to perform Kurtosis based pruning for sensor-fusion systems, in accordance with techniques of this disclosure. In the depicted environment 100, a sensor-fusion system 104 is mounted to, or integrated within, the vehicle 102. Although illustrated as a car, the vehicle 102 can represent other types of vehicles and machinery (e.g., a motorcycle, a bus, a tractor, a semi-trailer truck, watercraft, aircraft, or other heavy equipment) including manned and unmanned systems that may be used for a variety of purposes. The vehicle 102 can travel on a road 118, which may be lined with a street sign 112, vegetation 116, or other stationary objects (not shown) including buildings and parked vehicles. Moving objects may also be in or near the road 118, for example, a pedestrian 114 and a moving vehicle 110. In FIG. 1, the vehicle 102 is traveling down the road 118 and the sensor-fusion system 104 of the vehicle 102 has a FOV that encompasses the road 118 in addition to the street sign 112, the vegetation 116, the pedestrian 114, and the moving vehicle 110.

The sensor-fusion system 104 can track objects in the FOV based on sensor data obtained from multiple sensors of the vehicle 102. Matching objects between multiple different sensors enables the sensor-fusion system 104 to reliably and accurately track objects that may need to be avoided while the vehicle 102 navigates on the road 118.

In general, manufacturers can mount the sensor-fusion system 104 to any moving platform that can travel on the road 118. The sensor-fusion system 104 can project its FOV from any exterior surface of the vehicle 102. For example, vehicle manufacturers can integrate at least a part of the sensor-fusion system 104 into a side mirror, bumper, roof, or any other interior or exterior location where the FOV includes the road 118 and objects moving or stationary that are near the road 118. Manufacturers can design the location of the sensor-fusion system 104 to provide a particular FOV that sufficiently encompasses the road 118 on which the vehicle 102 may be traveling. In the depicted implementation, a portion of the sensor-fusion system 104 is mounted near a rear quarter section of the vehicle 102.

The sensor-fusion system 104 includes a fusion module 108 and one or more sensor interfaces 106-1 through 106-*n* (collectively "sensor interfaces 106"), which includes a lidar interface 106-1, a camera interface 106-2, a radar interface 106-3, and one or more other sensor interfaces 106-*n*. Each of the sensor interfaces 106 provides the sensor-fusion system 104 with sensor data of a particular type. For example, the lidar interface 106-1 produces lidar data generated by one or more lidar sensors and the radar interface 106-3 generates radar data produced by a set of radar sensors in communication with the radar interface 106-3.

Through fusing or combining sensor data, the fusion module 108 enables the vehicle 102 to accurately track and avoid obstacles within the FOV. For example, although not precisely shown in FIG. 1, the fusion module 108 executes on a processor or other hardware, which configures the sensor-fusion system 104 to combine the different types of sensor data obtained from the sensor interfaces 106 into an object-track or other usable form for tracking objects in the FOV. The fusion module 108 determines a plurality of candidate object-tracks according to first sensor data (e.g., obtained from the radar interface 106-3), and the fusion module 108 identifies a set of candidate object-tracks according to second sensor data (e.g., obtained from the camera interface 106-2). Each candidate object-track inferred from the first sensor data and the second sensor data is associated with an object in the FOV. For example, any of the objects 110, 112, 114, and 116 may be associated with the candidate object-tracks indicated at the sensor interfaces 106. The fusion module 108 identifies candidate object-tracks associated with the same object and fuses the information derived from the first and second sets of sensor data to produce an accurate representation of an object, or part of an object that is identified in the FOV.

When fusing together multiple large sets of candidate object-tracks, the fusion module 108 may generate a feasibility matrix as described in U.S. Pat. No. 10,565,468 to Schiffmann et al. (herein after referred to as "Schiffmann"), the entire content of which is incorporated by reference. In Schiffmann, a sensor-fusion system assigns an identifier to each candidate object-track associated with an object candidate detected using a camera, and the sensor-fusion system assigns an identifier to each candidate object-track (e.g., detection) obtained using radar. For example, a feasibility matrix of two dimensions is created. The first dimension represents a total number of columns, with one per each assigned radar identifier. The second dimension represents a total number of rows, with one row per each camera identifier assigned to the camera data. For each combination of camera and radar candidates represented by the feasibility matrix, probabilities are determined.

These probabilities may represent an evidence matrix. The entries of the evidence matrix are determined based on errors between the camera and radar candidate object-tracks, and indicate a degree of confidence or feasibility that candidate object-tracks detected with the camera are associated with the same object candidate as the candidate object-tracks detected with the radar. For each intersection of a column and a row of the feasibility matrix, the evidence matrix includes a corresponding entry, which may be a value ranging from zero to one hundred percent or some other equivalent numerical value. This value indicates a probability of whether the radar identifier and the camera identifier represent, which map to that intersection of the feasibility matrix, track the same object. Some additional filtering may be applied to the probabilities computed over time. For example, it may be assumed that at least one combination of candidate radar and camera detections has a reasonable chance of matching and as such, combinations of candidates with the greatest probabilities of occurrence may be relied on rather than other combinations with probabilities that are too low (e.g., the values do not satisfy a threshold).

Returning to the environment 100 of FIG. 1, the fusion module 108 joins the data sets with the assistance of Kurtosis based pruning, which prevents the fusion module 108 from undergoing combinatorial explosions in the process, due to large-scale matching. For example, the fusion module 108 is at risk of combinatorial explosions when the camera data and the lidar data are dense (e.g., a high-resolution) including detailed observations of the FOV. Kurtosis based pruning minimizes the total quantity of comparisons that are ultimately performed through "normalizing" (e.g., zeroing) some entries of a feasibility matrix to improve other operations of the vehicle 102 that rely on the data. From a feasibility matrix that has been modified through Kurtosis pruning, the fusion module 108, for example, can quickly identify a particular combination of a camera-based and one or more radar-based candidate object-tracks that together have a greatest probability of being associated with the same object. Having identified the camera-based and one or more radar-based candidate object-tracks, position, size, object class, and direction can be determined. This and other information can aid the vehicle 102 in performing an autonomous or semi-autonomous driving function.

Figure 2:
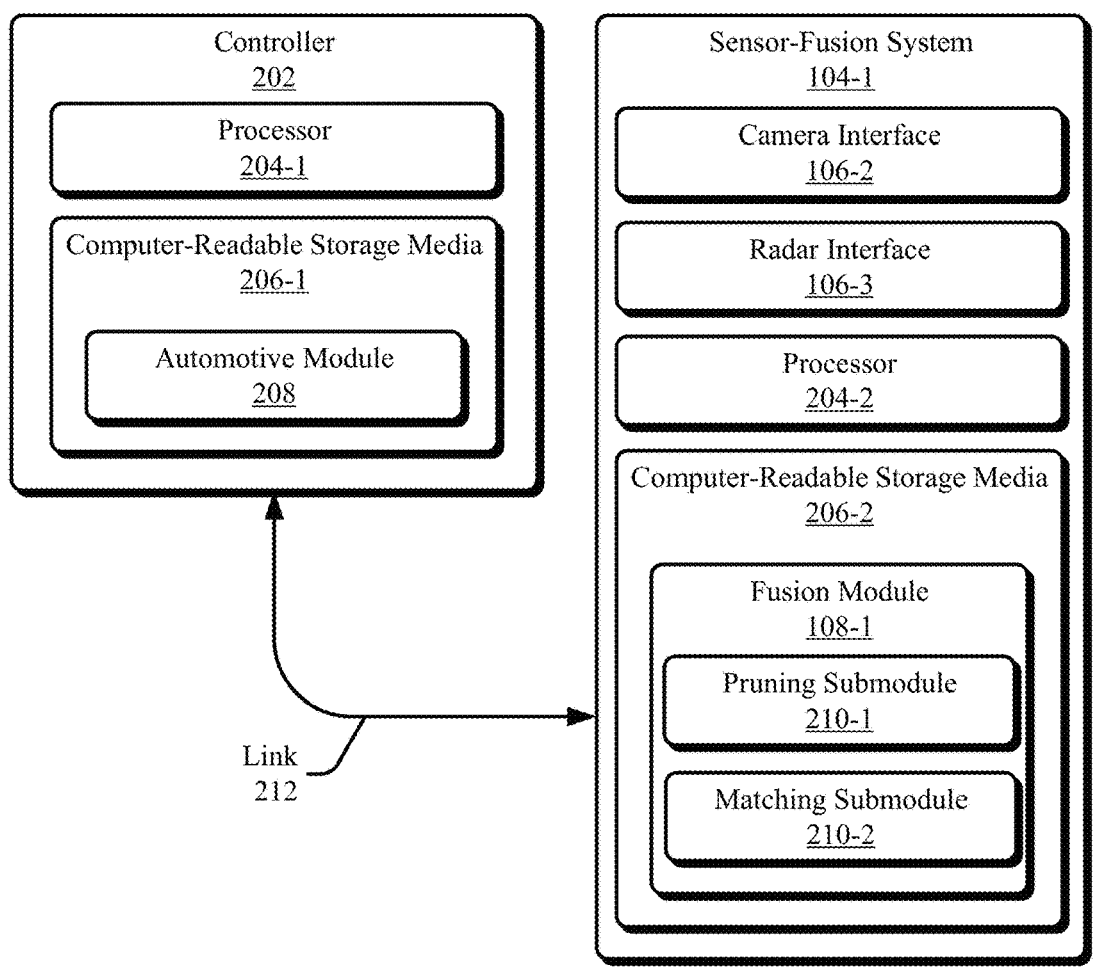
FIG. 2 illustrates an example of an automotive system configured to perform Kurtosis based pruning for sensor-fusion systems, in accordance with techniques of this disclosure.

FIG. 2 illustrates an example of an automotive system 200 configured to perform Kurtosis based pruning for sensor-fusion systems, in accordance with techniques of this disclosure. The automotive system 200 can be integrated within the vehicle 102. For example, the automotive system 200 includes a controller 202 and a sensor-fusion system 104-1. The sensor-fusion system 104-1 is an example of the sensor-fusion system 104 and can be integrated into an automotive or other vehicular environment. The sensor-fusion system 104 and the controller 202 communicate over a link 212. The link 212 may be a wired or wireless link and in some cases includes a communication bus. The controller 202 performs operations based on information received over the link 212, such as data output from the sensor-fusion system 104 as objects in the FOV are identified from processing and merging object-tracks.

The controller 202 includes a processor 204-1 and a computer-readable storage medium (CRM) 206-1 (e.g., a memory, long-term storage, short-term storage), which stores instructions for an automotive module 208. The sensor-fusion system 104-1 includes a radar interface 106-3 in addition to the camera interface 106-2. Any number of other sensor interfaces including the sensor interfaces 106 may likewise be used. The sensor-fusion system 104-1 may include processing hardware that includes a processor 204-2 and a computer-readable storage medium (CRM) 206-2, which stores instructions associated with a fusion module 108-1. The fusion module 108-1, which is an example of the fusion module 108, includes a pruning submodule 210-1 and a matching submodule 210-2.

The processors 204-1 and 204-2 can be two separate or a single microprocessor or a pair of or a single system-on-chip of a computing device, a controller, or a control unit. The processors 204-1 and 204-2 execute computer-executable instructions stored within the CRMs 206-1 and 206-2. As an example, the processor 204-1 can execute the automotive module 208 to perform a driving function or other operation of the automotive system 200. Similarly, the processor 204-2 can execute the fusion module 108-1 to infer objects in the FOV based on sensor data obtained from multiple different sensor interfaces 106 of the system 102. The automotive module 208, when executing at the processor 204-1, can receive an indication of one or more objects detected by the fusion module 108-1 in response to the fusion module 108-1 combining and analyzing sensor data generated at each of the sensor interfaces 106 (e.g., the camera interface 106-2 and the radar interface 106-3).

Generally, the automotive system 200 executes the automotive module 208 to perform a function. For example, the automotive module 208 can provide automatic cruise control and monitor for the presence of objects in or near the road 118. In such an example, the fusion module 108-1 provides the sensor data or derivative thereof (e.g., a feasibility matrix) to the automotive module 208. The automotive module 208 may provide alerts when the data obtained from the fusion module 108-1 indicates one or more objects are crossing in front of the vehicle 102.

For ease of simplicity, the matching submodule 210-2 and the pruning submodule 210-1 of the fusion module 108-1 are described below with reference primarily to the camera interface 106-2 and the radar interface 106-3, without reference to the other sensor interfaces 106. It should be understood, however, that the fusion module 108-1 can combine sensor data from more than just two different categories of sensor and can rely on sensor data output from other types of sensors besides just cameras and radar. To further reduce complexity of the description, the matching submodule 210-2 may operate according to a rule that the radar interface 106-3 can detect any vehicle that the camera interface 106-2 can detect. In addition, the camera interface 106-2 is configured to produce at most one object-track for each object of interest in the FOV; the radar interface 106-3 is configured to generate several object-tracks for each object of interest in the FOV (e.g., forty or fifty object-tracks in the case of a semi-truck and trailer).

In the following example, a "match pattern" refers to a specific way of assigning one of M different radar-based candidate object-tracks to one of N different camera-based object-tracks. It is expected that some of the M radar-based candidate object-tracks may not be matched to any of the N camera-based object-tracks because they correspond to objects that are detected by the radar but not by vision. The term "feasible match" refers to a particular match pattern that is deemed to be a legitimate candidate pair of candidate object-tracks, for purposes of matching, based on consideration of possible errors in the radar and camera. A "feasible match pattern" represents a match pattern consisting of N different feasible match candidates. A feasible match pattern may later be deemed "infeasible" (e.g., due to object-occlusions, due to sensor-occlusions, and other problems with a match pattern). A match pattern is infeasible if only a single match is infeasible, even if all other N matches in that pattern are feasible. A single infeasible match causes an entire match pattern to be infeasible.

The camera interface 106-2 can operate independent from the radar interface 106-3 and may be independently operable from the other sensor interfaces 106. The camera interface 106-2 outputs sensor data, which can be provided in various forms, such as a list of candidate objects being tracked, along with estimates for each of the objects' position, velocity, object class, and reference angles (e.g., an azimuth angle to a "centroid" reference point on the object, such as a center of a rear face of the moving vehicle 110, other "extent angles" to near corners of the rear face of the moving vehicle 110).

The radar interface 106-3 can maintain a list of "detections" and corresponding detection times. Each detection typically consists of a range value, a range-rate value, and an azimuth angle value. There is generally more than one detection on each vehicle that is unobstructed in the FOV and at a reasonably close range to the vehicle 102. Similar to the camera interface 106-2, the radar interface 106-3 provides a list of radar-based candidate object-tracks, which are assumed to mostly be tracking scattering centers on vehicles it detects.

The camera interface 106-2 can estimate azimuth angles and object classifications more accurately than other sensor types, however, the camera interface 106-2 may be deficient in estimating some parameters, such as, object position and velocity. The radar interface 106-3 can accurately-measure object range and range rate but may be less accurate in measuring the azimuth angle. The complementing characteristics of the camera and radar leads to accuracy in the fusion module 108-1 matching the data between the sensor interfaces 106-2 and 106-3.

The matching submodule 210-2 relates the list of candidate detections produced at the radar interface 106-3 to the list of candidate objects reported at the camera interface 106-2. The matching submodule 210-2 effectively calculates for each camera-based object-track, the probability that it should be matched to each of a limited number of candidate radar-based candidate object-tracks.

The pruning submodule 210-1 enhances the speed and efficiency of the matching submodule 210-2 by causing the matching submodule 210-2 to refrain from evaluating some matches that are less likely to be associated with the same object. In other words, the pruning submodule 210-1 eliminates some of "the guess work" by eliminating some combinations of radar-based candidate and camera-based object-tracks that are eventually tried by the matching submodule 210-2, which enables a correct association between the radar interface 106-3 and the camera interface 106-2 to be identified in fewer steps than without the pruning submodule 210-1.

During Kurtosis based pruning in the environment 100, the pruning submodule 210-1 applies, for each lidar or radar object-track from the plurality of lidar-based or radar-based object-tracks, a respective weight or evidence to a particular camera-based object-track from the set of camera-based object-tracks. In an example where multiple lidar-based or radar-based candidate object-tracks possibly align with a single (i.e., the particular) camera-based object-track, for each camera-based object-track, a normalized weight or other evidence of matching is assigned to each possible lidar-based or radar-based candidate object-track. The error between each camera-based object-track and corresponding lidar-based or radar-based candidate is calculated. An inverse of these matching errors between each camera-based object-track and each possible lidar-based or radar-based candidate object-track, is calculated to be evidence. The inverse of the errors that is used as evidence that may be normalized to produce, for each camera-based object-track, a distribution of evidence associated with all lidar-based or radar-based candidate object-tracks.

Based on the applied weights, the pruning submodule 210-1 determines a distribution of the respective weights applied to the particular camera-based object-track. From the distribution of the evidence values considering all candidates for each camera-based object-track, a "Kurtosis" is calculated. The Kurtosis of the evidence distribution represents a measure of the shape of the distribution. Based on the shape, some candidates with greater evidence are selected for matching and remaining candidates with lower evidence is discarded (e.g., zeroed). The pruning submodule 210-1 may prune at least one lidar-based or radar-based candidate object-track based on a respective weight applied to a match pattern including the at least one object-track. In some examples, the pruning submodule 210-1 refrains from pruning any of the candidate object-tracks, for example, if based on the Kurtosis, the number of candidates to retain is equal to the total number of candidates. Note, a lidar-based or radar-based candidate object-track can be feasible for more than one camera-based object-track. Therefore, pruning it for one camera-based object-track does not necessarily mean it will be pruned for other camera-based object-tracks as well. Pruning involves discarding the lidar-based or radar-based object-track as one candidate for only this particular camera-based object-track, without affecting other camera-based object-tracks. This pruning process ensures that the total quantity of candidate match patterns involving the lidar-based or radar-based candidate object-tracks for each camera-based object-track is reduced, which reduces combinatorial complexity. Following pruning of a candidate, the matching submodule 210-2 matches a camera-based object-track with one or more remaining lidar-based or radar-based candidate object-tracks after the at least one object-track is pruned.

Example Architecture

Figures 1, 3:
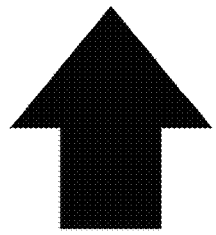
Figure 3:
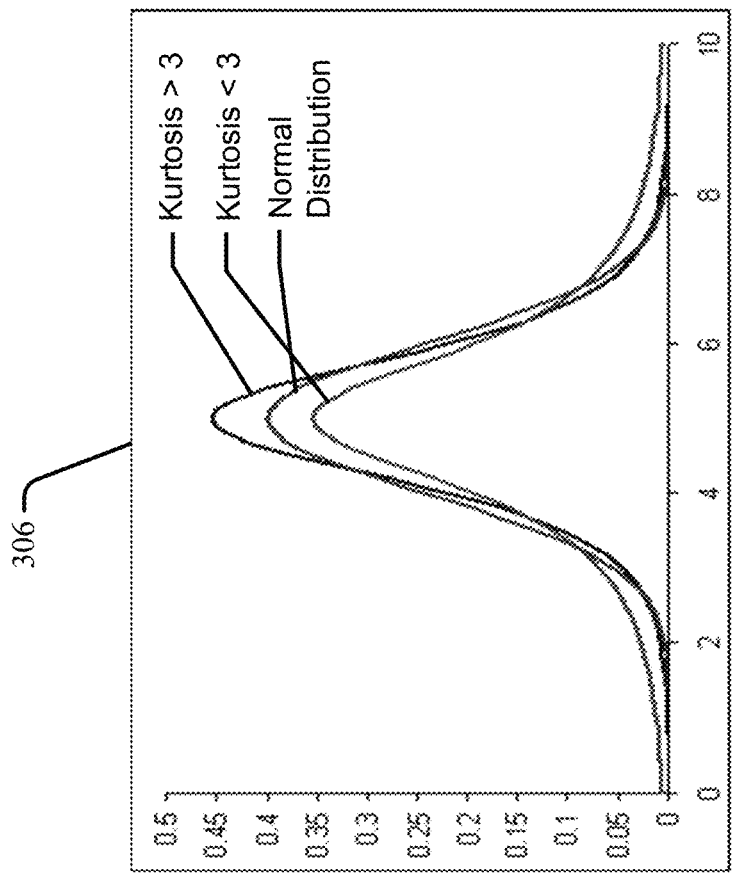
Figure 2:
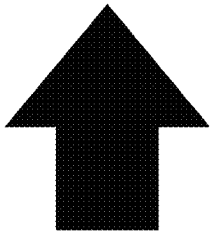
Figure 3:
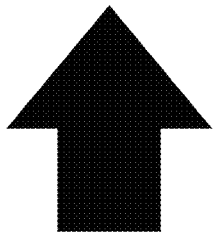

FIGS. 3-1 through 3-3 illustrate details of an example of Kurtosis based pruning, in accordance with techniques of this disclosure. More specifically, a feasibility matrix 302-1 may be generated by the matching submodule 210-2, as shown in FIG. 3-1. However, prior to evaluating the feasibility matrix 302-1 for potential targets or obstacles in the FOV, the pruning submodule 210-1 refines the feasibility matrix 302-1 and produces in its place, a feasibility matrix 302-3, as shown in FIG. 3-3. Of particular note, the feasibility matrix 302-1 includes fifteen different feasible matches (e.g., each number one is a feasible match between a radar-based object-track and a camera-based object-track). After Kurtosis pruning of the feasibility matrix 302-1, the pruning submodule 210-1 generates the feasibility matrix 302-3, which has only eight feasible matches. The matching submodule 210-2 processes the feasibility matrix 302-3 in fewer operations than if the matching submodule 210-2 were to process the feasibility matrix 302-1 because there are fewer feasible matches to test after some (e.g., seven or more than forty-percent) of the feasible matches are Kurtosis-pruned.

The feasibility matrix 302-1 includes columns V1 through V6 and rows R1 through R10. In this example, the matching submodule 210-2 obtains radar data indicative of ten different radar-based candidate object-tracks via the radar interface 106-3. Other camera data indicative of six different camera-based object-tracks is obtained via the camera interface 106-2. The feasibility matrix 302-1 includes an estimated mapping between the radar-based candidate object-tracks R1 through R10 and the camera-based object-tracks V1 through V6. The matching submodule 210-2 applies various gating to the radar data and the camera data to obtain the example feasibility matrix 302-1.

A weighting is applied to the feasibility matrix 302-1. The weighting is based on a unique matching error that is quantified for each of the feasible matches. For example, the pruning submodule 210-1 computes matching errors for each feasible match. The matching error between a camera-based object-track and a radar-based candidate object-track may be calculated using Equation 1:

Match error=$k$_MATCHQUALITY_AZIMUTH_WEIGHT $x$ az_error_factor $x$ delta_az+$k$_MATCHQUALITY_RANGE_WEIGHT $x$ rng_error_factor $x$ delta_rng+ $k$_MATCHQUALITY_VEL_WEIGHT $x$ delta_speed     Equation 1

The "match error" sum result of the Formula 1 represents a weighted sum of the squared difference of the respective azimuth (delta_az), respective range (delta_rng), and respective speed (delta_speed) between a camera-based object-track and a radar-based candidate object-track for a feasible match. Applying the formula to each feasible match produces an error values, from which is forms the basis for an evidence matrix 302-2, which is shown in FIG. 1. To obtain the evidence matrix 302-2, an inverse of each non-zero element of an error matrix is determined. The inverse of each non-zero elements from the error matrix can be used to determine an element in the evidence matrix.

These evidence values of the evidence matrix 302-2 may be normalized for all the feasible matches for a particular camera-based object-track. The lower the matching error, the higher the evidence value. For example, the feasible match R1V2 has a low matching error relative to the other feasible matches in the evidence matrix 302-2, and the feasible match R5V3 has a high matching error relative to the other feasible matches.

As shown in a plot 306 of FIG. 3-2, the pruning submodule 210-1 determines Kurtosis values 304 based on a distribution of the evidence indicated by the evidence matrix 302-2. By definition, Kurtosis is a measure of the "tailedness" of a distribution. It is the fourth standardized moment, defined in Equation 2 as:

$$Kurt[X] = \frac{E[(X-\mu)^4]}{(E[(X-\mu)^2])^2} = \frac{\mu_4}{\sigma^4} \qquad \text{Equation 2}$$

As the plot 306 illustrates, the value of Kurtosis for a normal distribution is three. The value goes below three when the distribution gets flatter than the normal distribution. The value is greater than three and goes higher as the distribution gets more peaked than a normal distribution.

A Kurtosis value is calculated for each distribution of evidence. That is, for each column in the evidence matrix 302-2, Kurtosis values 304 are calculated. From the evidence matrix 302-2 of normalized evidence values, each camera-based object-track V1 through V6 has a corresponding distribution of evidence attributed to the radar-based object-tracks R1 through R10. The Kurtosis values 304 for the distributions of the camera-based object-tracks V1, V2 and V3 are equal. This indicates that the evidence distributions of these three-candidate object-tracks is similar. From the evidence matrix 302-2, the values for these camera-based object-tracks V1, V2, and V3 are mostly zero for all corresponding radar-based candidate object-tracks, with only a single radar-based candidate object-track having a very high evidence value of approximately equal to 1.0. This means that for each of the camera-based object-tracks V1, V2 and V3, only a single radar-based candidate object-track contains almost all of the evidence, the rest of the radar-based candidate object-tracks with little to no evidence are kept zero. The peakedness of their distributions is high or around 0.0. For the camera-based object-tracks V4 and V6, only two radar-based candidate object-tracks contain almost all evidence, therefore, the peakedness of each of their distributions is slightly less than those of the camera-based object-tracks V1, V2 and V3. The camera-based object-track V5 also has two candidates with high evidence values and therefore "all the evidence" and the rest of the radar-based candidate object-tracks are around zero. However, the peakedness for the camera-based object track V5 is slightly less than that of the candidate object-tracks V4 and V6, as is manifested in the calculated Kurtosis values 304.

The pruning submodule 210-1 selects feasible matches to prune based on the Kurtosis values 304. Based on the Kurtosis values 304 for each camera-based object-track V1 through V6, the pruning submodule 210-1 selects N highest-evidenced radar-based candidate object-tracks and discards the rest of the radar-based candidate object-tracks from consideration with that camera-based object-track. The value of N depends on the Kurtosis values 304 and can be tuned accordingly. Generally, N will decrease linearly as the Kurtosis values 304 increase, and vice versa. An algorithm executed by the pruning module 210-1 in arriving at such a setting is provided next.

In a loop of all camera-based object-tracks V1 through V6: the pruning submodule 210-1 checks whether the Kurtosis value is greater than or equal to 8.0, and if true, sets N to one. Otherwise, the pruning submodule 210-1 checks whether the Kurtosis value is greater than or equal to 6.0 and less than 8.0, and if true, sets N to two. Otherwise, the pruning submodule 210-1 checks whether the Kurtosis value is greater than or equal to 4.0 and less than 6.0, and if true, sets N to three. Lastly, the pruning submodule 210-1 infers that the Kurtosis value is less than 4.0 and sets N to four. The pruning submodule 210-1 compares the Kurtosis value for each of the camera-based object-tracks, each time setting N to be equal to one, two, three, or four.

The pruning submodule 210-1 discards the selected feasible matches from the feasibility memory matrix by inserting null data, zeros, or other very low values in their place and leaves the unselected feasible matches with highest evidence values (e.g., equal to one). As shown in FIG. 3 in comparing the feasibility matrix 302-1 to the feasibility matrix 302-3, the top N number of candidates with highest evidence values are retained and the rest are discarded as candidates.

In this example, the number of feasible patterns of candidates went down from one hundred forty-four to only eight after this pruning. The feasible matches with highest evidence values are retained and discarded are only those with low evidence values, a quantity of the discarded being based on Kurtosis values. Reducing the number of feasible candidates matches has a significant effect on computational performance of the matching submodule 210-2, particularly when the feasibility matrix 302-1 is not sparse and when the number of camera-based object-tracks is large. This reduction helps to keep the number of feasible matches to be within a more-manageable threshold limit.

Example Methods

Figure 4:
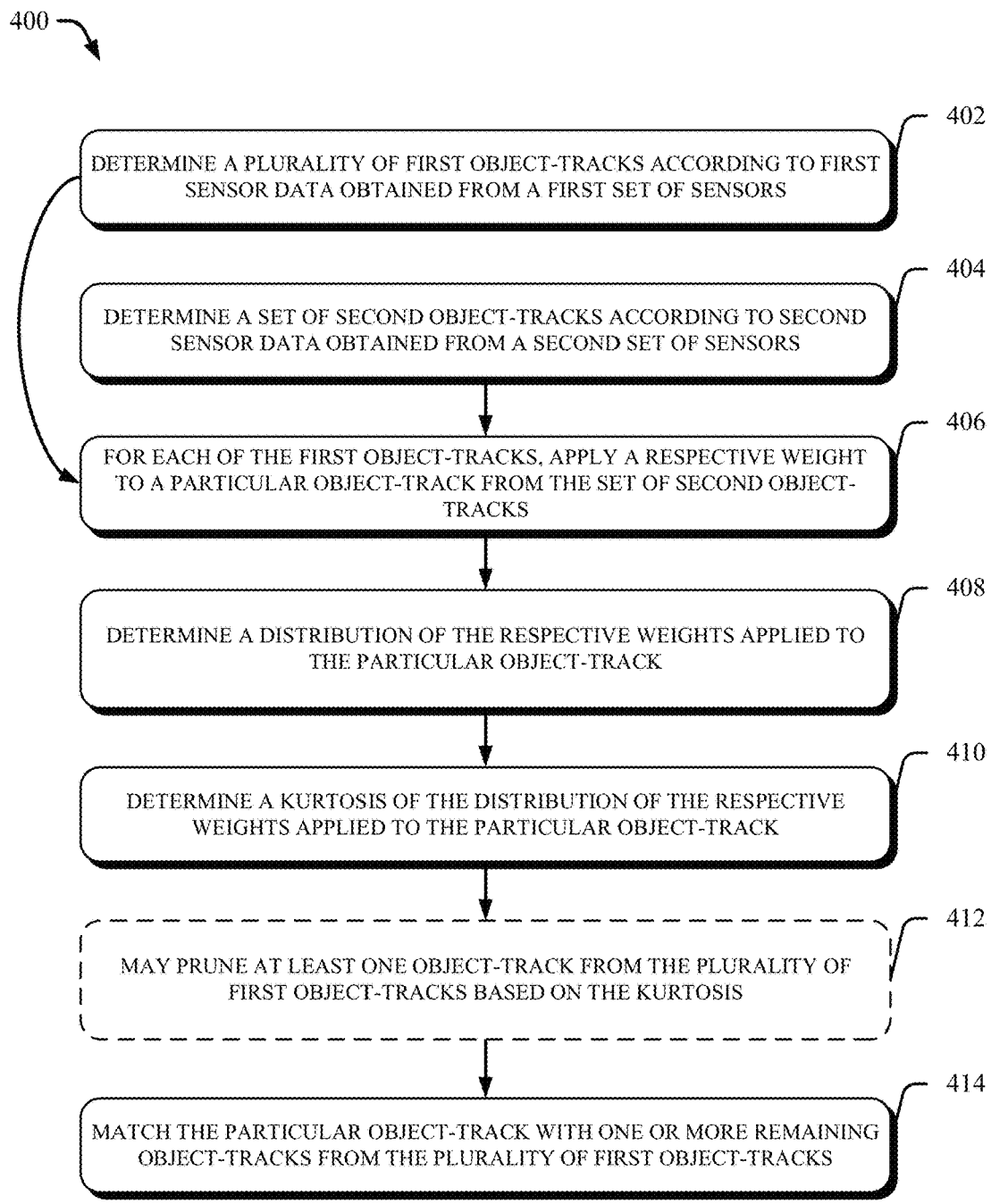
FIG. 4 illustrates an example method for Kurtosis based pruning for sensor-fusion systems, in accordance with techniques of this disclosure.

FIG. 4 illustrates an example method for Kurtosis based pruning for sensor-fusion systems, in accordance with techniques of this disclosure. The method 400 is shown as a set of operations (or acts) performed in, but not limited to, the order or combinations in which the operations are shown or described. Further, any of the operations may be repeated, combined, or reorganized to provide other methods. In portions of the following discussion, reference may be made to the previously introduced figures, in describing some non-limiting examples of the method 400.

At 402, a plurality of first candidate object-tracks are determined according to first sensor data obtained from a first set of sensors. Each object-track from the plurality of first candidate object-tracks may be associated with at least a portion of a stationary object or a portion of a moving object. At 404, a set of second object-tracks are determined according to second sensor data obtained from a second set of sensors. In some examples, the first set of sensors include one or more radar sensors, lidar sensors, or ultrasound sensors and the second set of sensors include one or more visual sensors including optical cameras or infrared cameras. At 406, for each first object-track from the plurality of first candidate object-tracks, a respective weight is applied to a particular object-track from the set of second object-tracks.

At 408, based on the respective weight applied to the particular object-track for each first object-track from the plurality of first candidate object-tracks, a distribution of the respective weights applied to particular object-track is determined. This may include, determining matching errors between one or more candidate object-tracks from the plurality of first candidate object-tracks and one or more candidate object-tracks from the set of second object-tracks. The respective weights applied to the particular object-track can be determined based on the matching errors. For example, the matching errors can be determined to be an error matrix (or other suitable structure) containing one or more probabilities indicating a likelihood of a false detection (e.g., a false positive or a false negative) and then determining the respective weights to be applied to the particular object-track from an inverse of the error matrix.

At 410, a Kurtosis of the distribution of the respective weights applied to particular object-track is determined. At 412, at least one object-track may be pruned from the plurality of first object-tracks based on the Kurtosis. It is not always necessary to discard at least one object-track in this scheme. For example, there may be only one candidate radar-based object-track for particular camera-based object-track, and the single candidate radar-based object-track is not to be discarded because such action would leave the camera-based object-track with no option for pairing to a candidate radar-based object-track. The Kurtosis is used to determine a quantity of N object-tracks to retain, where N represents the highest weighted radar-based candidate object-tracks that are candidates for matching to a particular camera-based object-track. The value of N is greater than or equal to one. In the above example shown in FIG. 3-3, the feasibility matrix 302-1 and the feasibility matrix 302-3 each have only one candidate R2 for a vision track V1. R2 is retained after Kurtosis based pruning is done to the feasibility matrix 302-1. For the vision track V5, there are 2 candidate radar-based object tracks and both are retained after Kurtosis-based pruning because the Kurtosis value indicates that it is acceptable to retain both if not more.

The pruning at 412 can include discarding the at least one candidate object-track from the plurality set of first candidate object-tracks in response to determining that the respective weight applied to the particular object-track for the at least one candidate object-track is less than the respective weight applied to the particular object-track for the one or more remaining candidate object-tracks. For example, based on the Kurtosis, a quantity of candidate object-tracks to retain from the plurality of first candidate object-tracks is determined. The plurality of first candidate object-tracks can then be divided into two sub-sets including a first subset of candidate object-tracks to retain and a second subset of candidate object-tracks to discard. The first subset of candidate object-tracks to retain may include the N highest-weighted candidate object-tracks from the plurality of first candidate object-tracks that are applied to the particular object-track, where N is equal to the quantity of candidate object-tracks to retain. The pruning at 412 finishes by discarding the at least one candidate object-track from the plurality of first candidate object-tracks.

Although the at least one candidate object-track is discarded from the plurality of first candidate object-tracks, it may be reused in a match with a different candidate object-track from the set of second object-tracks. Even though a candidate object-track may be pruned, it may be retained for subsequent matchings. Discarding the at least one candidate object-track from the plurality of first candidate object-tracks may include retaining the at least one candidate object-track for matching against a different candidate object-track from the set of second object-tracks. Returning to the example above where two sub-sets are created, the pruning at 412 can include refraining from discarding the first subset of candidate object-tracks from the plurality of first candidate object-tracks to match the particular object-track with one or more remaining candidate object-tracks from the plurality of first candidate object-tracks after the at least one candidate object-track is pruned.

At 414, the particular object-track is matched with one or more remaining candidate object-tracks from the plurality of first candidate object-tracks after the at least one candidate object-track is pruned. Matching the particular object-track with the one or more remaining candidate object-tracks at 414 can occur through matching at least one candidate object-track from the one or more remaining candidate object-tracks to the particular object-track. For instance, the one or more remaining candidate object-tracks include a total quantity of candidate object-tracks that is less than a total quantity of candidate object-tracks included in the plurality of first candidate object-tracks determined at 402.

Candidate object-tracks with higher respective weights/evidence values are selected for matching and remaining object-tracks are pruned as candidates. Kurtosis values aid in determining how many of the high evidence valued object-tracks will be retained as candidates for each match-comparison performed with a different candidate object-track. Kurtosis based pruning of candidate object-tracks minimizes a total quantity of comparisons that are performed when fusing together a large quantity of object-tracks. Problems encountered by other fusion trackers are preventable through Kurtosis-pruning, which prevents combinatorial explosion of possible matches from overburdening a sensor-fusion system.

ADDITIONAL EXAMPLES

In the following section, additional examples of Kurtosis based pruning for sensor-fusion systems are provided.

Example 1

A method comprising: determining, by a sensor-fusion system, a plurality of first object-tracks according to first sensor data obtained from a first set of sensors; determining, by the sensor-fusion system, a set of second object-tracks according to second sensor data obtained from a second set of sensors; for each first object-track from the plurality of first object-tracks, applying, by the sensor-fusion system, a respective weight to a particular object-track from the set of second object-tracks; determining, by the sensor-fusion system and based on the respective weight applied to the particular object-track for each first object-track from the plurality of first object-tracks, a distribution of the respective weights applied to particular object-track; determining, by the sensor-fusion system, a Kurtosis of the distribution of the respective weights applied to particular object-track; pruning, by the sensor-fusion system, from the plurality of first object-tracks, at least one object-track based on the respective weight applied to the particular object-track for the at least one object-track from the plurality of first object-tracks; and matching, by the sensor-fusion system, the particular object-track with one or more remaining object-tracks from the plurality of first object-tracks after the at least one object-track is pruned.

Example 2

The method of example 1, wherein pruning the at least one object-track from the plurality of first object-tracks comprises: discarding the at least one object-track from the plurality of first object-tracks in response to determining that the respective weight applied to the particular object-track for the at least one object-track is less than the respective weight applied to the particular object-track for each of the one or more remaining object-tracks.

Example 3

The method of any of the preceding examples, further comprising: determining, based on the Kurtosis, a quantity of candidate object-tracks to retain from the plurality of first candidate object-tracks; dividing the plurality of first candidate object-tracks into two sub-sets including a first subset of candidate object-tracks to retain and a second subset of candidate object-tracks to discard, the first subset of candidate object-tracks to retain including the N highest-weighted candidate object-tracks from the plurality of first candidate object-tracks that are applied to the particular object-track, N being equal to the quantity of candidate object-tracks to retain; and discarding the at least one candidate object-track from the plurality of first candidate object-tracks by discarding the second subset of candidate object-tracks from the plurality of first candidate object-tracks.

Example 4

The method of any of the preceding examples, wherein discarding the at least one candidate object-track from the plurality of first candidate object-tracks comprises retaining the at least one candidate object-track for matching against a different candidate object-track from the set of second object-tracks.

Example 5

The method of any of the preceding examples, wherein determining the distribution of the respective weights applied to the particular object-track comprises: determining matching errors between one or more candidate object-tracks from the plurality of first candidate object-tracks and one or more candidate object-tracks from the set of second object-tracks; and determining the respective weights applied to the particular object-track based on the matching errors.

Example 6

The method of any of the preceding examples, wherein the first set of sensors comprise one or more radar sensors, lidar sensors, or ultrasound sensors and the second set of sensors comprise one or more visual sensors including optical cameras or infrared cameras.

Example 7

The method of any of the preceding examples, wherein each object-track from the plurality of first object-tracks is associated with at least a portion of a stationary or moving object.

Example 8

The method of any of the preceding examples, wherein matching the particular object-track with the one or more remaining object-tracks comprises: matching at least object-track from the one or more remaining object-tracks to the particular object-track.

Example 9

The method of any of the preceding examples, wherein the one or more remaining object-tracks comprise a total quantity of object-tracks that is less than a total quantity of object-tracks included in the plurality of first object-tracks.

Example 10

A system, the system comprising: a processor configured to: determine a plurality of first object-tracks according to first sensor data obtained from a first set of sensors; determine a set of second object-tracks according to second sensor data obtained from a second set of sensors; for each first object-track from the plurality of first object-tracks, apply a respective weight to a particular object-track from the set of second object-tracks; determine, based on the respective weight applied to the particular object-track for each first object-track from the plurality of first object-tracks, a distribution of the respective weights applied to particular object-track; determine a Kurtosis of the distribution of the respective weights applied to particular object-track; prune, from the plurality of first object-tracks, at least one object-track based on the respective weight applied to the particular object-track for the at least one object-track from the plurality of first object-tracks; and match the particular object-track with one or more remaining object-tracks from the plurality of first object-tracks after the at least one object-track is pruned.

Example 11

The system of any of the preceding examples, wherein the processor is configured to prune the at least one object-track from the plurality of first object-tracks by: discarding the at least one object-track from the plurality of first object-tracks in response to determining that the respective weight applied to the particular object-track for the at least one object-track is less than the respective weight applied to the particular object-track for each of the one or more remaining object-tracks.

Example 12

The system of any of the preceding examples, wherein the processor is further configured to: determine, based on the Kurtosis, a quantity of candidate object-tracks to retain from the plurality of first candidate object-tracks; divide the plurality of first candidate object-tracks into two sub-sets including a first subset of candidate object-tracks to retain and a second subset of candidate object-tracks to discard, the first subset of candidate object-tracks to retain including the N highest-weighted candidate object-tracks from the plurality of first candidate object-tracks that are applied to the particular object-track, N being equal to the quantity of candidate object-tracks to retain; and discard the at least one candidate object-track from the plurality of first candidate object-tracks by discarding the second subset of candidate object-tracks from the plurality of first candidate object-tracks.

Example 13

The system of any of the preceding examples, wherein the processor is further configured to: refraining from discarding the first subset of candidate object-tracks from the plurality of first candidate object-tracks to match the particular object-track with one or more remaining candidate object-tracks from the plurality of first candidate object-tracks after the at least one candidate object-track is pruned.

Example 14

The system of any of the preceding examples, wherein the processor is configured to determine the distribution of the respective weights applied to the particular object-track by: determining matching errors between one or more candidate object-tracks from the plurality of first candidate object-tracks and one or more candidate object-tracks from the set of second object-tracks; and determining the respective weights applied to the particular object-track based on the matching errors.

Example 15

The system of any of the preceding examples, wherein the first set of sensors comprise one or more radar sensors, lidar sensors, or ultrasound sensors and the second set of sensors comprise one or more visual sensors including optical cameras or infrared cameras.

Example 16

The system of any of the preceding examples, wherein the processor is configured to match the particular object-track with the one or more remaining object-tracks by: matching at least object-track from the one or more remaining object-tracks to the particular object-track.

Example 17

The system of any of the preceding examples, wherein the system comprises a sensor-fusion system communicatively coupled to a controller of a vehicle, the processor being further configured to: output, to the controller, an indication of the one or more remaining object-tracks that match the particular object-track for use in controlling the vehicle.

Example 18

The system of any of the preceding examples, wherein each candidate object-track from the plurality of first candidate object-tracks is associated with at least a portion of a stationary or moving object.

Example 19

The system of any of the preceding examples, wherein the one or more remaining candidate object-tracks comprise a total quantity of candidate object-tracks that is less than a total quantity of candidate object-tracks included in the plurality of first candidate object-tracks.

Example 20

A system comprising: means for determining a plurality of first object-tracks according to first sensor data obtained from a first set of sensors; means for determining a set of second object-tracks according to second sensor data obtained from a second set of sensors; for each first object-track from the plurality of first object-tracks, means for applying a respective weight to a particular object-track from the set of second object-tracks; means for determining, based on the respective weight applied to the particular object-track for each first object-track from the plurality of first object-tracks, a distribution of the respective weights applied to particular object-track; means for determining a Kurtosis of the distribution of the respective weights applied to particular object-track; means for pruning, from the plurality of first object-tracks, at least one object-track based on the respective weight applied to the particular object-track for the at least one object-track from the plurality of first object-tracks; and means for matching the particular object-track with one or more remaining object-tracks from the plurality of first object-tracks after the at least one object-track is pruned.

Example 21

A system comprising means for performing any of the methods of the preceding examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with combinatorial explosion can occur in other systems that resolve assignment problem where a quantity of agents or tasks is large. Therefore, although described as a way to improve vehicle based matching techniques, the techniques of the foregoing description can be applied to other assignment problems to reduce a total number of assignments between tasks and agents.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
receiving, by a processor, a set of vision tracks corresponding to one or more first objects detected by a vision-sensor system on a vehicle;
receiving, by the processor, a set of non-vision tracks corresponding to one or more second objects detected by a non-vision-sensor system on the vehicle;
for each one of the vision tracks in the set of vision tracks, determining whether a first object of the one or more first objects corresponding to the one of the vision tracks matches a second object of the one or more second objects corresponding to any of the non-vision tracks by:
determining possible associations between the one of the vision tracks and each of the set of non-vision tracks;
determining a likelihood of a false detection for each one of the possible associations of a match produced between the one of the vision tracks and the non-vision track for the one of the possible associations;
determining weighting evidence for each one of the possible associations based on a function applied to the likelihood of the false detection determined for the one of the possible associations;
determining a distribution of the weighting evidence for each of the possible associations;
determining a Kurtosis value of the distribution for each one of the possible associations to weight the one of the possible associations among the possible associations; and
selecting, based on the Kurtosis value of each of the possible associations, a high weight subset of the possible associations; and
determining whether the first object corresponding to the one of the vision tracks matches the second object corresponding to any of the set of non-vision tracks by matching the one of the vision tracks to the second object corresponding to the non-vision track of at least one of the possible associations selected for the high weight subset.

2. The method of claim 1, wherein determining whether the first object corresponding to the one of the vision tracks matches the second object corresponding to any of the non-vision tracks further includes refraining from matching the one of the vision tracks to the second object corresponding to the non-vision track of any other of the possible associations that are not selected for the high weight subset.

3. The method of claim 1, wherein the vision-sensor system comprises at least one camera and the set of vision tracks are derived from camera data of the one or more first objects.

4. The method of claim 1, wherein the non-vision-sensor system comprises one or more radar sensors, and the set of non-vision tracks are derived from radar data of the one or more second objects.

5. The method of claim 1, wherein the non-vision-sensor system comprises one or more lidar sensors, and the set of non-vision tracks are derived from lidar data of the one or more second objects.

6. The method of claim 1, wherein the non-vision-sensor system comprises one or more ultrasound sensors, and the set of non-vision tracks are derived from ultrasound data of the one or more second objects.

7. The method of claim 1, further comprising outputting, to a controller for use in controlling a vehicle, an indication of any of the set of vision tracks that are matched with any of the set of non-vision tracks.

8. The method of claim 7, further comprising refraining, from outputting to the controller, an indication of any of the set of vision tracks that are not matched with any of the set of non-vision tracks.

9. The method of claim 1, wherein at least one of the set of vision tracks and at least one of the set of non-vision tracks are associated with a portion of a stationary or moving object.

10. The method of claim 1, wherein the function applied to the likelihood of the false detection determined for each one of the possible associations comprises an inverse operation applied to the likelihood of a false detection for the one of the possible associations.

11. The method of claim 1, wherein the high weight subset comprises fewer than a total quantity of all other of the possible associations that are not selected for the high weight subset.

12. A system comprising:
at least one processor configured to:
receive a set of vision tracks corresponding to one or more first objects detected by a vision-sensor system on a vehicle;
receive a set of non-vision tracks corresponding to one or more second objects detected by a non-vision-sensor system on the vehicle;
for each one of the vision tracks in the set of vision tracks, determine whether a first object of the one or more first objects corresponding to the one of the vision tracks matches a second object from the one or more second objects corresponding to any of the set of non-vision tracks by:
determining possible associations between the one of the vision tracks and each of the set of non-vision tracks;
determining a likelihood of a false detection for each one of the possible associations of a match produced between the one of the vision tracks and the non-vision track for the one of the possible associations;
determining weighting evidence for each one of the possible associations based on a function applied to the likelihood of the false detection determined for the one of the possible associations;
determining a distribution of the weighting evidence for each of the possible associations;
determining a Kurtosis value of the distribution for each one of the possible associations to weight the one of the possible associations among the possible associations; and
selecting, based on the Kurtosis value of each of the possible associations, a high weight subset of the possible associations; and
determine whether the first object corresponding to the one of the vision tracks matches the second object corresponding to any of the set of non-vision tracks by matching the one of the vision tracks to the second object corresponding to the non-vision track of at least one of the possible associations selected for the high weight subset.

13. The system of claim 12, wherein the at least one processor is configured to determine whether the first object corresponding to the one of the vision tracks matches the second object corresponding to any of the set of non-vision tracks by refraining from matching the one of the vision tracks to the second object corresponding to the non-vision track of any other of the possible associations that are not selected for the high weight subset.

14. The system of claim 12, wherein the at least one processor is further configured to output, to a controller for use in controlling a vehicle, an indication of any of the set of vision tracks that are matched with any of the set of non-vision tracks.

15. The system of claim 14, further comprising refrain, from outputting to the controller, an indication of any of the set of vision tracks that are not matched with any of the set of non-vision tracks.

16. The system of claim 12, further comprising the vision-sensor system, wherein the vision-sensor system comprises at least one camera and the set of vision tracks are derived from camera data of the one or more first objects.

17. The system of claim 13, further comprising the non-vision-sensor system, wherein the non-vision-sensor system comprises one or more radar sensors, lidar sensors, and ultrasounds sensors.

18. The system of claim 17, wherein the set of non-vision tracks are derived from sensor data of the one or more second objects.

19. A computer-readable storage medium comprising instructions that, when executed, cause at least one processor to:
receive a set of vision data corresponding to one or more first objects detected by a vision-sensor system on a vehicle;
receive a set of non-vision data corresponding to one or more second objects detected by a non-vision-sensor system on the vehicle;
for each one of the parts of the vision data, determine whether a first object of the one or more first objects corresponding to the one of the parts of the vision data matches a second object of the one or more second objects corresponding to of the non-vision data by:
determining possible associations between the one of the parts of the vision data and each part of the non-vision data;
determining a probability of a false detection for each one of the possible associations of a match produced between the one of the parts of the vision data and the part of the non-vision data for the one of the possible associations;
determining weighted evidence for each one of the possible associations based a function applied to the probability of the false detection determined for the one of the possible associations;
determining a distribution of the weighted evidence for each of the possible associations;
determining a Kurtosis value of the distribution for each one of the possible associations to weight the one of the possible associations among the possible associations; and
selecting, based on the Kurtosis value of each of the possible associations, a high weight subset of the possible associations; and
determine whether the first object corresponding to the one of the parts of the vision data matches the second object corresponding to the non-vision data by matching the one of the parts of the vision data to the second object corresponding to the part of the non-vision data of at least one of the possible associations selected for the high weight subset.

20. The computer-readable storage medium of claim 19, wherein:
the set of vision data comprises a set of vision tracks with each part of the vision data being a vision track corresponding to one of the one or more first objects; and
the set of non-vision data comprises a set of non-vision tracks with each part of the non-vision data being a non-vision track corresponding to one of the one or more second objects.

* * * * *

UNITED STATES PATENT AND TRADEMARK OFFICE
CERTIFICATE OF CORRECTION

PATENT NO. : 12,054,179 B2
APPLICATION NO. : 18/173045
DATED : August 6, 2024
INVENTOR(S) : Syed Asif Imran et al.

Page 1 of 1

It is certified that error appears in the above-identified patent and that said Letters Patent is hereby corrected as shown below:

In the Claims

Column 19, Claim 19, Line 36: after "to", delete "of"

Signed and Sealed this
Eighth Day of April, 2025

Coke Morgan Stewart
*Acting Director of the United States Patent and Trademark Office*